US011742687B2

(12) United States Patent
Luzinski et al.

(10) Patent No.: US 11,742,687 B2
(45) Date of Patent: Aug. 29, 2023

(54) WIRELESSLY POWERED BATTERY PACK FOR RETROFIT IN LEGACY DEVICES

(71) Applicant: NuCurrent, Inc., Chicago, IL (US)

(72) Inventors: Jason Luzinski, Chicago, IL (US);
Mark D. Melone, Frankfort, IL (US);
Rob Diebold, LaGrange, IL (US)

(73) Assignee: NuCurrent, Inc., Chicago, IL (US)

( * ) Notice: Subject to any disclaimer, the term of this patent is extended or adjusted under 35 U.S.C. 154(b) by 84 days.

(21) Appl. No.: 17/245,945

(22) Filed: Apr. 30, 2021

(65) Prior Publication Data
US 2022/0352741 A1     Nov. 3, 2022

(51) Int. Cl.
*H01M 10/46* (2006.01)
*H02J 7/02* (2016.01)
*H02J 7/00* (2006.01)

(52) U.S. Cl.
CPC .............. *H02J 7/02* (2013.01); *H02J 7/0013* (2013.01); *H02J 7/0044* (2013.01)

(58) Field of Classification Search
CPC .......... H02J 7/02; H02J 7/0013; H02J 7/0044; H02J 50/005; H02J 50/10
USPC ......... 320/107, 108, 110, 112, 114, 115, 116
See application file for complete search history.

(56) References Cited

U.S. PATENT DOCUMENTS

| 8,497,659 | B2 * | 7/2013 | Navid | ..................... | H02J 50/10 320/140 |
| 2013/0278207 | A1 | 10/2013 | Yoo | | |
| 2014/0009120 | A1 | 1/2014 | Kim | | |
| 2019/0013687 | A1 | 1/2019 | Shevde et al. | | |
| 2019/0036360 | A1 | 1/2019 | Zilles et al. | | |

FOREIGN PATENT DOCUMENTS

| KR | 20150012055 A | 2/2015 | | |
| WO | WO-2018076991 A1 * | 5/2018 | ................ | H02J 7/34 |
| WO | WO-2018132117 A1 * | 7/2018 | ................ | H02J 7/35 |

OTHER PUBLICATIONS

Translation of WO-2018076991-A1. (Year: 2018).*
Avert for "Charging Station for Wii Remote with 4 Rechargeable Battery Packs + Charging Station+USB Cable," Amazon product. Product page dated 2022 but older reviews predated Apr. 30, 2021. (Year: 2022).*
International Searching Authority, PCT International Search Report and Written Opinion, PCT International Application No. PCT/US2022/027328 dated Aug. 23, 2022, 8 pages.

* cited by examiner

*Primary Examiner* — Edward Tso
(74) *Attorney, Agent, or Firm* — Lee Sullivan Shea & Smith LLP

(57) ABSTRACT

A device charging system includes a legacy battery-powered mobile electronic device configured for wired-only charging and a wireless charging enabled battery pack. The wireless charging enabled battery pack may contain one or more battery cells as well as a power management integrated circuit (IC) configured to manage charging of the battery cells. The wireless charging enabled battery pack also contains a wireless power module to receive power wirelessly from a WPT (wireless power transfer) power source outside of the legacy device. In keeping with embodiments of the disclosure, a pack microcontroller in the battery pack interfaces to the legacy device, presenting an interface consistent with a wired-only charged battery pack.

18 Claims, 7 Drawing Sheets

WIRELESSLY POWERED BATTERY PACK FOR RETROFIT IN LEGACY DEVICES

TECHNICAL FIELD

The present disclosure generally relates to systems and methods for wireless transfer of electrical power, and, more particularly, to a low cost system and method for providing legacy mobile electronic devices with selective wireless charging capability.

BACKGROUND

The first commercially available smart phone with built-in wireless charging capabilities was launched nearly a decade ago and the volume of consumer devices designed to use wireless charging has continued to climb since then. However, due to cost and other factors such as institutional inertia, many devices continue to be produced without wireless charging capabilities. That means such devices, which are defined as "legacy devices," herein, must be charged via a wired connection.

While the omission of wireless charging ability was an acceptable cost-benefit balance in an era when wireless chargers were scarce, there is now no shortage of wireless charging infrastructure. Nonetheless, many devices continue to lack wireless charging capability and thus cannot access this infrastructure. While it is possible to redesign an existing phone product to have wireless charging capabilities, this often requires prohibitive redesign costs and manufacturing change costs.

SUMMARY

In accordance with one aspect of the disclosure, a wireless charging system is provided having a battery-powered mobile electronic device with an installed battery pack, wherein the battery-powered mobile electronic device is configured for wired-only charging. Within the installed battery pack is a component group having one or more battery cells, a power management integrated circuit (IC) configured to manage charging of the battery cells and a wireless receiver system configured to wirelessly receive power from a power source outside of the device in order to charge the battery cells. A pack microcontroller within the battery pack interfaces to the battery-powered mobile electronic device, presenting an interface consistent with a wired-only charged battery pack.

In a refinement, the battery-powered mobile electronic device is configured for wired-only charging of the installed battery pack via a wired charging port. In a further refinement, the battery cells are lithium ion battery cells which, in yet another refinement, may be configured as a one-serial/two-parallel (1S2P) battery.

In accordance with another refinement, the power management IC is configured to select between wireless charging and wired sources for the charging of the battery cells.

The pack microcontroller communicates, in another refinement, via the I2C protocol, and in an optional aspect of this refinement may act as an I2C slave with respect to the battery-powered mobile electronic device itself while acting as an I2C master with respect to the power management IC and the wireless power module.

In another embodiment, a wireless charging system is provided, having a battery pack with one or more battery cells, a power management IC configured to manage charging of the battery cells, and a wireless receiver system configured to wirelessly receive power from an external power source for charging the one or more battery cells. In this embodiment, a pack microcontroller interfaces to a legacy battery-powered mobile electronic built having wired-only battery charging via an interface consistent with a wired-only charged battery pack.

In a refinement, the battery-powered mobile electronic device includes a wired charging port for wired-only charging of the installed battery pack, and in a further refinement, the battery cells of the battery pack include one or more lithium ion battery cells. In yet a further refinement, the lithium ion battery cells are configured as a 1S2P battery.

In yet another refinement within this embodiment, the power management IC is configured to select wireless or wired charging of the battery cells.

Continuing, in a further refinement, the pack microcontroller communicates in accordance with the I2C protocol, and may, in accordance with a further refinement, act as an I2C slave with respect to the device and as an I2C master with respect to the power management IC and the wireless power module.

In yet another embodiment, a wireless charging system includes a wireless charging dock with multiple charging stations, wherein each charging station is configured to receive a legacy battery-powered mobile electronic device manufactured to support wired-only battery charging. In this embodiment, a wireless power transfer unit is associated with each station, and each wireless power transfer unit includes a wireless power transfer coil configured to align with the battery compartment of the legacy battery-powered mobile electronic device when the device is installed in the station. In a refinement of this embodiment, each station includes one or more features to retain the legacy device within the station.

The wireless charging system may operate at a specific operating frequency and in a further refinement is configured to operate over a range of operating frequencies including the specific operating frequency.

In a further refinement, the wireless charging dock is configured to initiate charging when a legacy battery-powered mobile electronic device is placed in at least one of the charging stations, and in a further refinement, the wireless charging dock may initiate charging by activating the wireless power transfer unit associated with the station in which the legacy device has been placed.

These and other aspects and features of the present disclosure will be better understood when read in conjunction with the accompanying drawings.

Figure 1A:
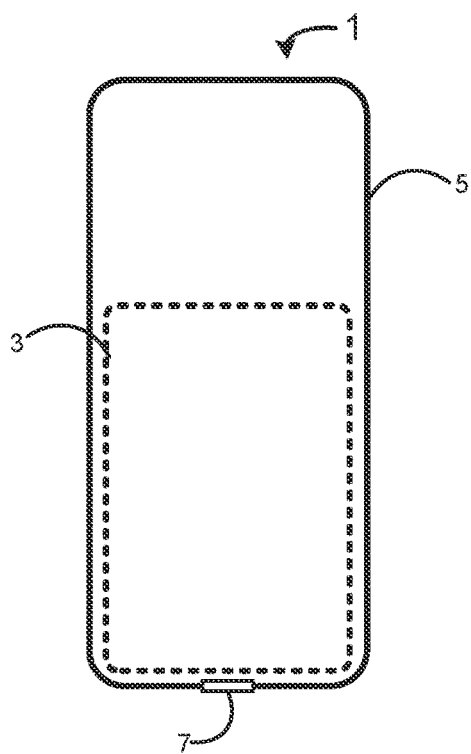
FIG. 1A is a simplified schematic drawing of a legacy mobile computing device in frontal view, within which embodiments of the disclosed principles may be implemented.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without unnecessary detail, in order to avoid needlessly obscuring aspects of the present teachings.

Wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

As noted above, many mobile communications devices, such as mobile computing devices, lack wireless charging capability, and may thus be considered legacy devices. In various embodiments, the disclosed principles facilitate the addition of wireless charging capabilities to legacy devices simply by replacing the legacy battery with a novel wireless-enabled battery configured as described herein. This change can increase customer satisfaction in the recharging experience and may also increase reliability and ruggedness of the charging components due to the ability to charge without aligning and inserting traditional wired connectors. Moreover, the use of wireless charging eliminates issues of debris and dirt collection associated with traditional wired connectors.

A "mobile computing device," as defined herein, refers to any computer, controller, phone, smart device, tablet computer, among other known computing devices, configured for use in a portable manner and/or for use in a plurality of non-static locations. Accordingly, such mobile computing devices are configured to be powered by a battery and/or other local power source that need not be constantly connected to an external power source or charger, when in portable use. Example mobile computing devices include, but are not limited to including, industrial handheld computers, industrial scanning computers and/or devices, logistics computers, industrial-field computers (e.g., computers for delivery service workers), retail scanning computers and/or devices, smart phones, cellular phones, tablet computers, e-readers and/or e-book readers, laptop computers, video game consoles, hybrid-mobile video game consoles, among other known mobile computing devices.

Figure 1B:
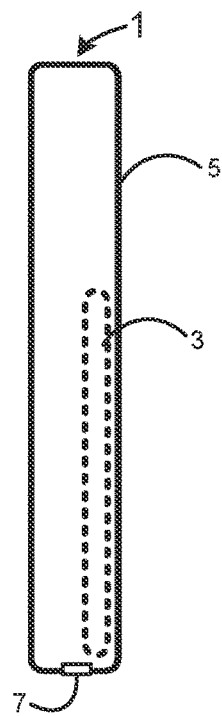
FIG. 1B is a simplified schematic drawing of a legacy mobile computing device in side view, within which embodiments of the disclosed principles may be implemented.

Referring now to the drawings and with specific reference to FIGS. 1A and 1B, a legacy mobile computing device 1 is shown in schematic form in front and side views respectively. Of importance to this disclosure, the legacy mobile computing device 1 includes a battery pack 3, located within and/or in operative connection with a housing 5. A wired charger port 7 allows the battery pack 3 to be charged while in the mobile computing device 1.

In order to remove the battery pack 3 from the legacy mobile computing device 1, some disassembly of the housing 5 may be required. Such disassembly may take the form of removing the back of the housing, for example, and is typically executed only to replace defective battery packs, at a typical frequency of less than once per year.

These aspects of a legacy mobile computing device 1, as that term is used herein, are in contrast to other types of mobile computing devices with much more easily exchanged battery packs. An example of such devices falling outside the scope of legacy smart phones is a typical commercial handheld device used in a storefront, warehouse, delivery service, etc. In this type of device, battery packs may be connected to, and disconnected from, the device without disassembly of the device's housing. Indeed, for such devices, this exchange occurs at a typical frequency of once or more per week or even per day.

Figure 2:
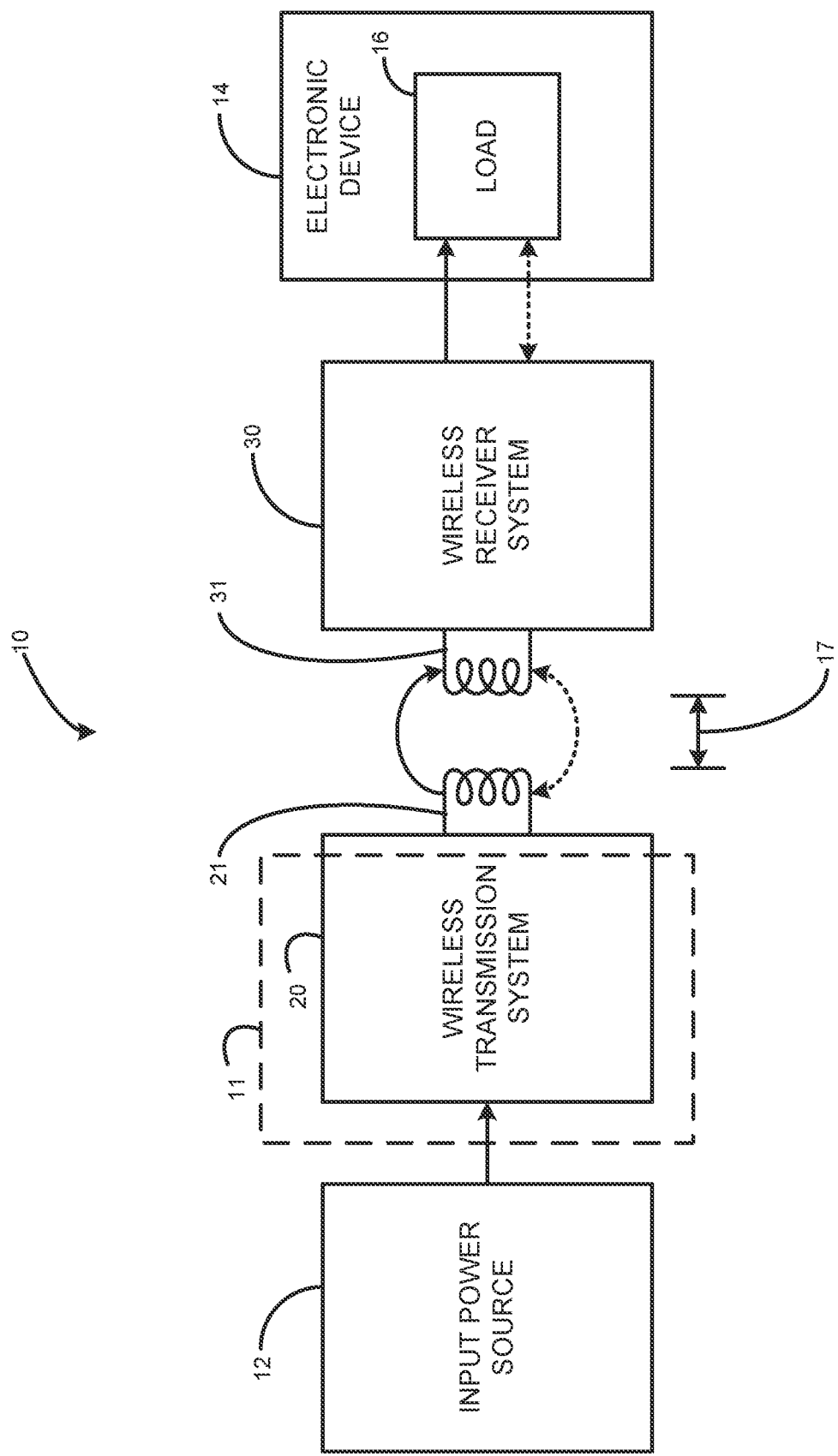
FIG. 2 is a block diagram of an embodiment of a system for wirelessly transferring electrical power and optionally electronic data, in accordance with the present disclosure.

Turning to FIG. 2, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 2, the wireless power transfer system 10 includes one or more wireless transmission systems 20 and one or more wireless receiver systems 30. A wireless receiver system 30 is configured to receive electrical signals from, at least, a wireless transmission system 20.

As illustrated, the wireless transmission system(s) 20 and wireless receiver system(s) 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, and a mechanical wall, among other things; however, there is no physical, electrical connection across such a separation distance or gap.

Thus, the combination of two or more wireless transmission systems 20 and wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, a magnetic, electromagnetic, resonant, and/or inductive field, among other wireless power and/or data transfers, connecting a first location, device, component, and/or source to a second location, device, component, and/or destination.

Further, while FIG. 2 may depict wireless power signals and wireless data signals transferring only from one antenna (e.g., a transmission antenna 21) to another antenna (e.g., a receiver antenna 31 and/or a transmission antenna 21), it is certainly possible that a transmitting antenna 21 may transfer electrical signals and/or couple with one or more other antennas and transfer, at least in part, components of the output signals or magnetic fields of the transmitting antenna 21. Such transmission may include secondary and/or stray coupling or signal transfer to multiple antennas of the system 10.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, at least one wireless transmission system 20 is associated with an input power source 12. The input power source 12 may be operatively associated with a host device, which may be any electrically operated device, circuit board, electronic assembly, dedicated charging device, or any other contemplated electronic device. Example host devices, with which the wireless transmission system 20 may be associated include, but are not limited to including, a legacy mobile electronic device or a wireless charging enabled battery pack as disclosed herein.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system(s) 20 is then used for at least two purposes: to provide electrical power to internal components of the wireless transmission system 20 and to provide electrical power to the transmission antenna 21. The transmission antenna 21 is configured to wirelessly transmit electrical signals conditioned and modified for wireless transmission by the wireless transmission system 20 via near-field magnetic coupling (NFMC). Near-field magnetic coupling enables the transfer of signals wirelessly through magnetic induction between the transmission antenna 21 and one or more of receiving antenna 31 of, or associated with, the wireless receiver system 30, another transmission antenna 21, or combinations thereof.

Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical signals through near field magnetic induction. In some examples, antenna operating frequencies may comprise relatively low operating frequency ranges, as known in the art, which may include any operating frequencies in a range of about 1 kHz to about 1 MHz. To that end, such low operating frequencies may include frequencies in a range of about 30 kHz to about 80 kHz, about 87 kHz to about 205 kHz (Qi Standard operating frequency range), 200 kHz to about 360 kHz, among other known low frequency operating frequency ranges. Alternatively, in some examples, antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance.

The wireless receiver system 30 may be associated with at least one electronic device 14, wherein the electronic device 14 may be any device that requires electrical power for any function and/or for power storage (e.g., via a battery and/or capacitor). For example, a mobile computing device having an improved battery pack according to embodiments of the present disclosure may be the electronic device 14.

Additionally, the electronic device 14 may be capable of receipt of electronically transmissible data. For example, in an embodiment, legacy smart phone having an improved battery pack according to embodiments of the present disclosure may receive a wireless data signal from a charging station via the improved battery pack.

In the drawing of FIG. 2, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While FIG. 2 shows the wireless transmission of both power and data, it will be appreciated that systems and methods herein may be used to transmit only wireless power signals, or instead, more than two signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 3:
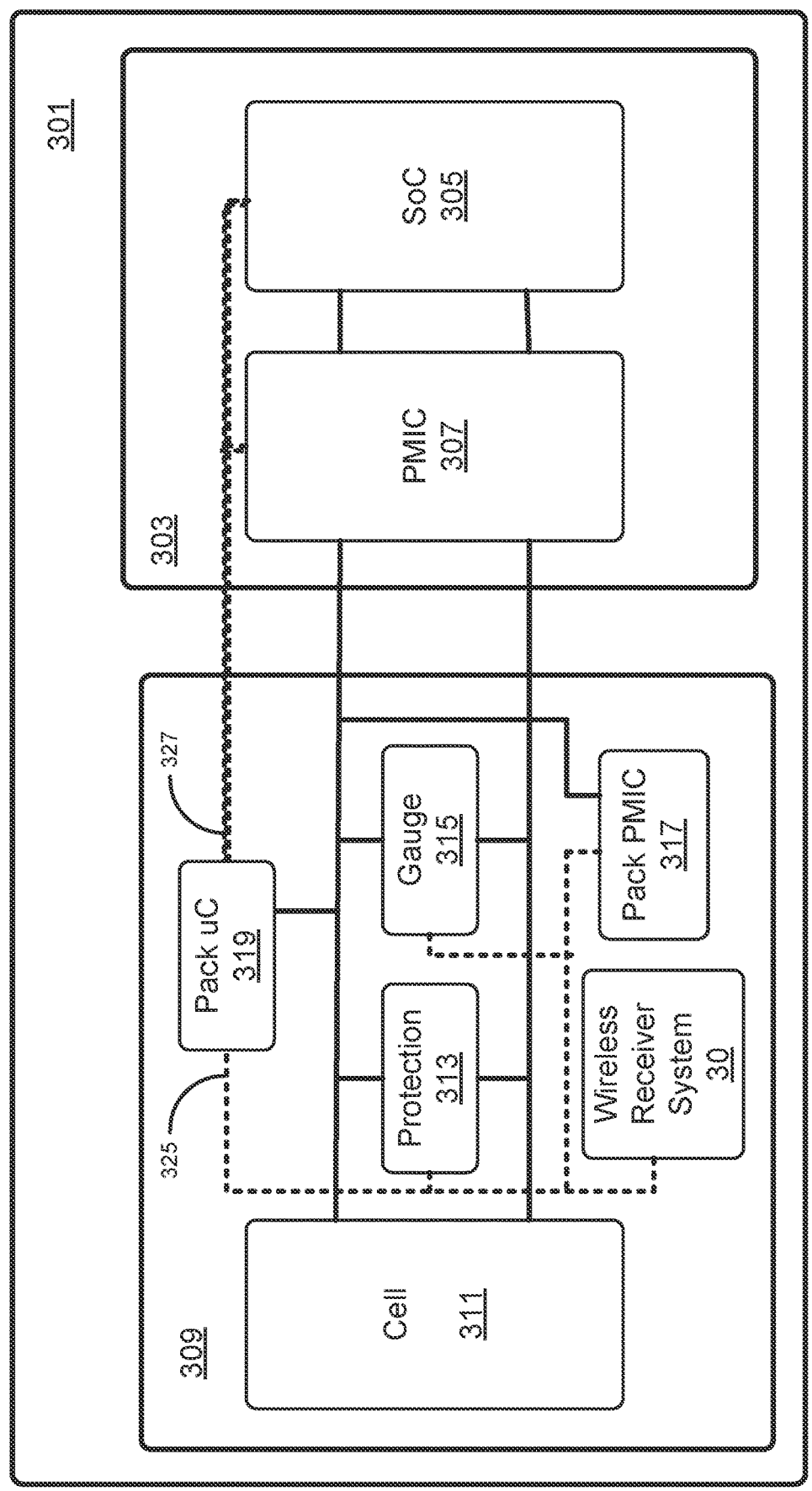
FIG. 3 is a schematic diagram of a wireless charging enabled battery pack and operating environment, in accordance with the present disclosure.

Turning now to FIG. 3, a schematic drawing of an improved battery pack and device context are shown in accordance with various embodiments of the disclosed principles. The illustrated environment includes a legacy mobile computing device 301, having a group of mobile device components 303, which include a chipset 305 and a traditional power management integrated circuit (PMIC, 307). The chipset 305 may include or comprise, for example, a system on a chip (SoC) or other suitable chip or chipset.

The mobile electronic device 301 as illustrated also includes an installed battery pack 309 according to the disclosed principles, which interfaces to the mobile device components 303 of the mobile computing device 301 via the chipset 305 and power controller 307, and which is managed by the power controller 307. The installed battery pack 309 includes a battery cell unit 311, which may have the same capacity and configuration as a legacy battery specified for use in the legacy mobile computing device 301. The battery cell unit 311 may be a single battery cell or may comprise multiple battery cells in either series or parallel connection. Accordingly, different series or parallel arrangements of battery cells for the example battery cell units 311, wherein multiple cells are included, based on a desired voltage or current characteristic for the electronics application. In some examples, the battery cell unit 311 is a one-serial/two-parallel (1S2P) lithium ion battery, which comprises two single lithium ion cells wired in parallel. It will be appreciated that other legacy cell configurations usable with the legacy mobile computing device 301 may be used in the battery cell unit 311 of the installed battery pack 309, according to the disclosed principles.

Turning more specifically to the installed battery pack 309 as illustrated, the pack 309 includes a number of elements in parallel with the battery cell unit 311, to enable the pack 309 to seamlessly interact with the legacy mobile computing device 301. In particular, in addition to providing power to the mobile electronic device 301 via the PMIC 307, the battery cell unit 311 also powers a cell protection module 313, a power level gauge module 315 (both being disposed across the battery cell unit 311 terminals), a pack PMIC 317 and a pack microcontroller 319.

The wireless receiver system 30, as discussed above, may be within the installed battery pack 309 and is configured to selectively wirelessly charge the cells of the battery cell unit 311, in response to instructions from the pack PMIC 317, and to interface to the phone components 303 of the legacy mobile computing device 301 via the pack microcontroller 319. This architecture is especially useful with lithium ion battery packs but may be used with any suitable cell technology. That is, the cells within the wireless-enabled battery pack 309 need not be of the same type as the cells of the counterpart legacy battery pack being replaced.

For wireless charging, the PMIC 317 receives electrical power from the wireless receiver system 30. The wireless receiver system 30 provides a regulated output to the PMIC 317 in an embodiment, which the PMIC 317 then selectively provides to charge the battery cell unit 311 of the battery pack 309. The illustrated architecture, including the battery pack 309 having the internal PMIC 317 and pack microcontroller 319, facilitates wireless charging when the battery pack 309 resides within the legacy mobile electronic device 301, but also allows uninstalled battery packs to be charged wirelessly, e.g., via industry standard Qi chargers, other multi-bay Qi chargers, or other chargers entirely.

Turning to the details of operation within an environment such as is shown in FIG. 3, first and second I2C (Inter-Integrated Circuit) protocol lines (325, 327) are used by the pack microcontroller 319 primarily to read remaining power from the power level gauge module 315 and provide control authentication to the device 303 respectively. In general terms, the I2C protocol facilitates communications between one or more digital integrated circuits (ICs) and one or more controller ICs. The I2C protocol employs two signal wires to exchange information.

In the illustrated embodiment, the pack microcontroller 319 acts as the I2C master over I2C line 325 with respect to the cell protection module 313, the power level gauge module 315, the pack PMIC 317 and the wireless power module 321. Similarly, the chipset 305, e.g., a SoC, acts as the I2C master over I2C line 327 with respect to the pack microcontroller 319. In this way, the legacy mobile computing device 301 is able to interact with the installed battery pack 309 as it would interact with any legacy battery pack, despite the fact that the installed battery pack 309 now also provides wireless charging.

In its role as the I2C master IC for the battery pack electronics and as the I2C slave IC relative to the legacy device itself (via SoC 305), the pack microcontroller 319 executes a series of computer-readable instructions stored in memory accessible to the pack microcontroller 319. These instructions include instructions for memory mapping with respect to I2C exchanges, instructions to allow real-time control of peripherals by the SoC 305 (e.g., via I2C pass-through), and instructions for the management of the cell 311 charge state, including charge/stop charge decisions and charge mode decisions (e.g., selecting between wired and wireless charging). The instructions executed by the pack microcontroller 319 also provide other functions such as system boot-up and protection, system recovery and power up, system initialization, enforcement of system limits (e.g., thermal limits), managing external charging outside of the device 301 (e.g., when the battery pack 309 alone is placed on a wireless charger or dock), sleep modes (e.g., a no-drain deep sleep mode), and dead battery recovery.

With respect to dead battery recovery, a dead (depleted) legacy wired-charging battery pack installed in a legacy electronic device will simply begin charging when the user connects the legacy device to a wired charger. However, in a pack-managed wirelessly charged battery pack, as disclosed herein, a dead battery cell will be unable to power up the remaining electronics within the battery pack 309, including the pack microcontroller 319. However, even in this situation, power received wirelessly at the wireless receiver system 30 may be used to power the pack microcontroller 319 sufficiently to allow managed wireless charging to begin.

As noted above, the architecture of the battery pack 309 allows for wireless charging within a legacy device such as device 301, or, alternatively, charging of the bare pack outside of the device by a wireless charger station or dock. Although a standard Qi charger is used herein as an example, the disclosed principles allow charging by any other suitable wireless charging system as well. For example, a wireless charging technology requiring additional pack authentication may be used. The difference in charger technology may be built into the battery pack 309, or the battery pack 309 may be made charger agnostic through the use of dynamic hardware tuning or software detection and switching.

As to the latter, for example, the battery pack 309 may utilize a Qi chipset, but with the pack software providing additional required authentication for another charger type. Alternatively, the pack software may disable authentication. Charger technologies may vary in other aspects as well, such as operating frequency. For this aspect, some current technologies, e.g., Qi, operate at a particular frequency but also allow for charging over a range of frequencies to support other charger technologies.

Existing legacy battery packs, i.e., battery packs without internal wireless charging support, fill a shaped volume within the legacy mobile computing device. This volume is typically a rectangular block that is substantially thinner along one of its non-primary axes, matching a legacy battery such as the battery 8 of FIG. 1. The volume may or may not include indentations or protuberances. Whatever the case, the wireless-enabled battery pack shown herein to replace such legacy packs should remain substantially within the same volume as the legacy pack.

However, the wireless-enabled battery pack shown herein contains additional elements not found in the counterpart legacy pack, e.g., a number of ICs and interconnections. Fortunately, legacy battery packs are not entirely filled with cell material, but also include electrical connection material, frequently organized on a small circuit board. To ensure that the wireless-enabled battery pack will fit within the legacy phone housing in the same location previously filled by the legacy battery pack, the wireless-enabled battery pack may use the existing extra battery pack space consumed by non-cell material to fit all needed additional components. Alternatively, the wireless-enabled battery pack may increase the available non-cell space by reducing the size of the cell-containing space. This may be accomplished via the use of higher capacity-per-volume cell technology or by reducing cell capacity.

Some of the additional components in the wireless-enabled battery pack, shown in schematic circuit form in FIG. 3, are small, allowing them to be placed in previously unused space, such as on an unused portion of a printed circuit board (PCB). Other additional components may be added by extending the design of an existing component to allow dual use, allowing functions to be included in a wireless-enabled battery pack without increasing its dimensions beyond specification for the legacy battery pack.

Figure 4A:
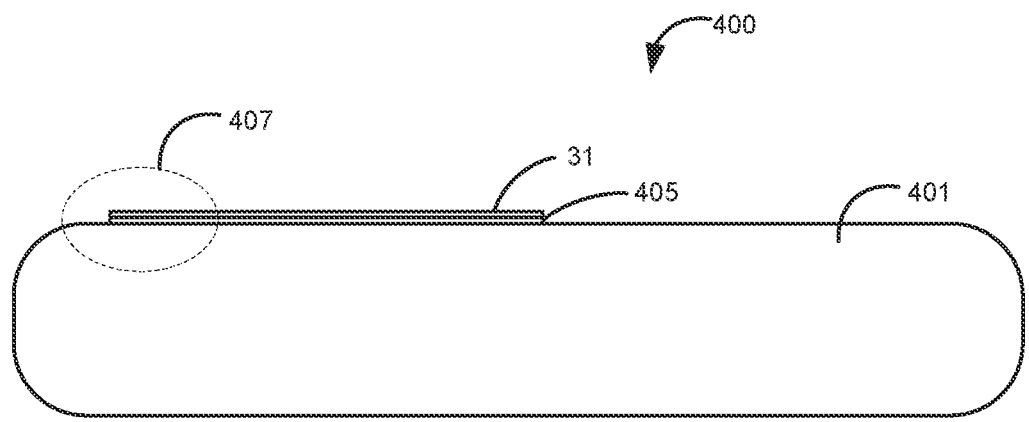
FIG. 4A is a schematic cross-section of a wireless charging enabled battery pack, in accordance with the present disclosure.
Figure 4B:
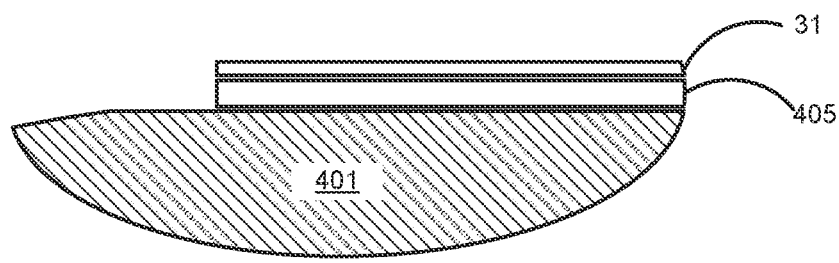
FIG. 4B is an enlarged detail schematic cross-section of the battery pack of FIG. 4A, in accordance with the present disclosure.

One example of the latter approach is the redesigning of a near field communications (NFC) coil to also serve as a wireless power and/or data transfer coil, in the manner of the receiver antenna 31 or transmission antenna 21 of FIG. 2. In this connection, FIGS. 4A and 4B show, in cross-section, an example configuration of a wireless-enabled battery pack also having the NFC functionality of the corresponding legacy battery pack. FIG. 4B is an enlarged cross sectional view of a portion 407 of FIG. 4A.

The illustrated wireless-enabled battery pack 400 includes cell material 401, which may be lithium-ion cell material or other suitable material. The wireless-enabled battery pack 400 also includes a receiver antenna 31 backed by a shield material 405, which may be a ferrite shield.

With respect to the ferrite shield material 405, selection of the material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

Figure 5A:
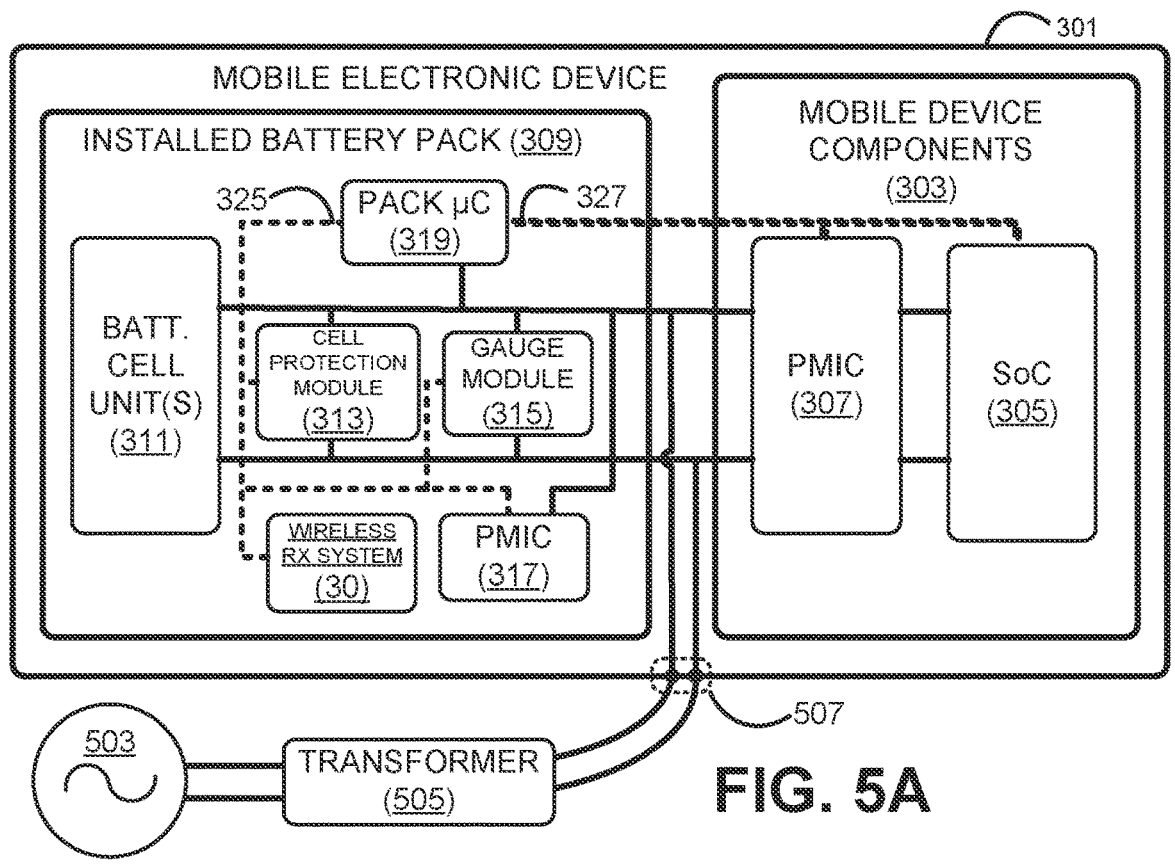
FIG. 5A is a schematic diagram of a wireless charging enabled battery pack and hard wired charging environment, in accordance with the present disclosure.
Figure 5B:
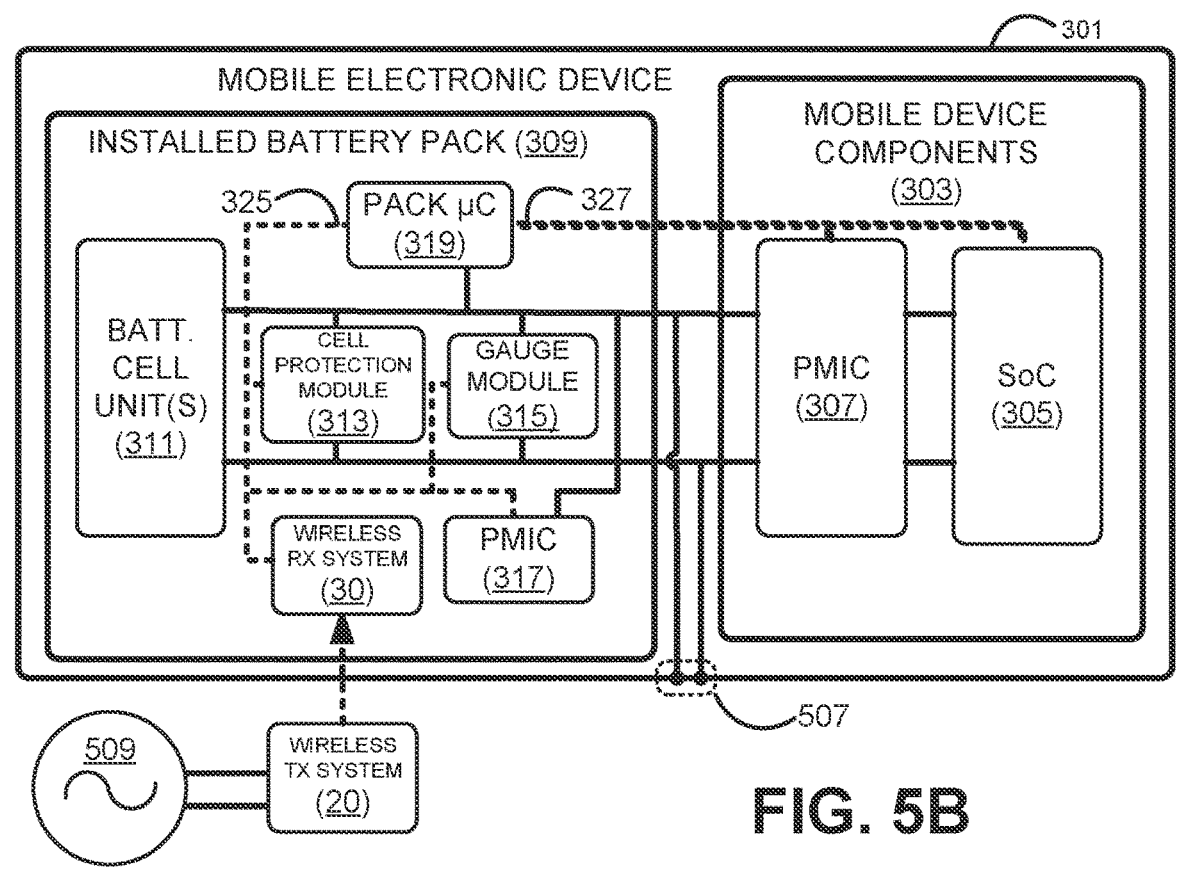
FIG. 5B is a schematic diagram of a wireless charging enabled battery pack and wireless charging environment, in accordance with the present disclosure.

As noted previously, the wireless-enabled battery pack described herein is, in various embodiments, capable of being charged wirelessly via WPT or in a wired manner via the wired charging port of the legacy device. FIG. 5A illustrates in circuit schematic view the effective circuit connection for wired charging, while FIG. 5B illustrates in circuit schematic view the effective circuit connection for wireless charging.

Referring to FIG. 5A, showing wired charging of a mobile computing device 301 such as that shown in FIG. 3, an AC power source 503 is connected, via a transformer 505, to a charging port 507 of the device 301. In this way, power from the AC power source 503 is transferred to the battery cell 311. Similarly, FIG. 5B shows wireless charging of a device 301 such as that shown in FIG. 3, wherein an AC power source 509 is connected to a wireless transmission system 20. The wireless transmission system 20 transmits power, in the manner shown in FIG. 2, to the wireless receiver system 30 of the battery pack 309, whereby the received power is selectively used to charge the battery cell unit 311 under the control of the pack PMIC 317.

Figure 6:
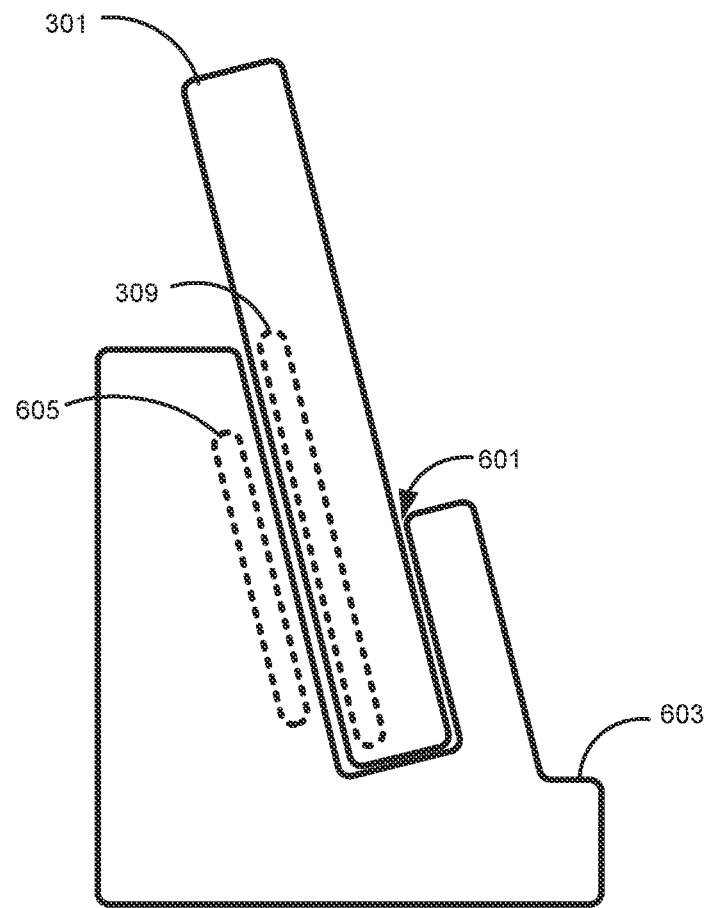
FIG. 6 is a schematic cross-sectional view of a legacy mobile device having an installed wireless charging enabled battery pack being charged wirelessly, in accordance with the present disclosure.

FIG. 6 illustrates an example usage environment within which the legacy mobile computing device 30, 1 having a wireless charging-enabled battery pack 309, may be charged. In particular, FIG. 6 is a cross-sectional view of the legacy mobile computing device 301 in a station 601 of a charger dock 603. The charger dock 603 includes a wireless power transfer transmitter 605 within coupling range of the wireless charging-enabled battery pack 309 to charge the pack. Each charger dock 600 station 601 is physically configured such that the legacy mobile computing device 301 fits securely therein, and may or may not include clips or other features or surfaces to retain the legacy mobile computing device 301 in the station 601. Though not shown, the charger dock 603 may include multiple stations to charge multiple devices. In some non-limiting examples, the charger dock 603 may be integrated with a multiple-device wireless power transfer system, such as those disclosed in U.S. patent application Ser. No. 16/733,516 to Peralta, et. al. ("WIRELESS POWER TRANSFER SYSTEM FOR SIMULTANEOUS TRANSFER TO MULTIPLE DEVICES"), which is commonly owned by the assignee of the instant application and hereby incorporated by reference in its entirety, for all that it teaches, discloses, incorporates and suggests, without exclusion.

Figure 7:
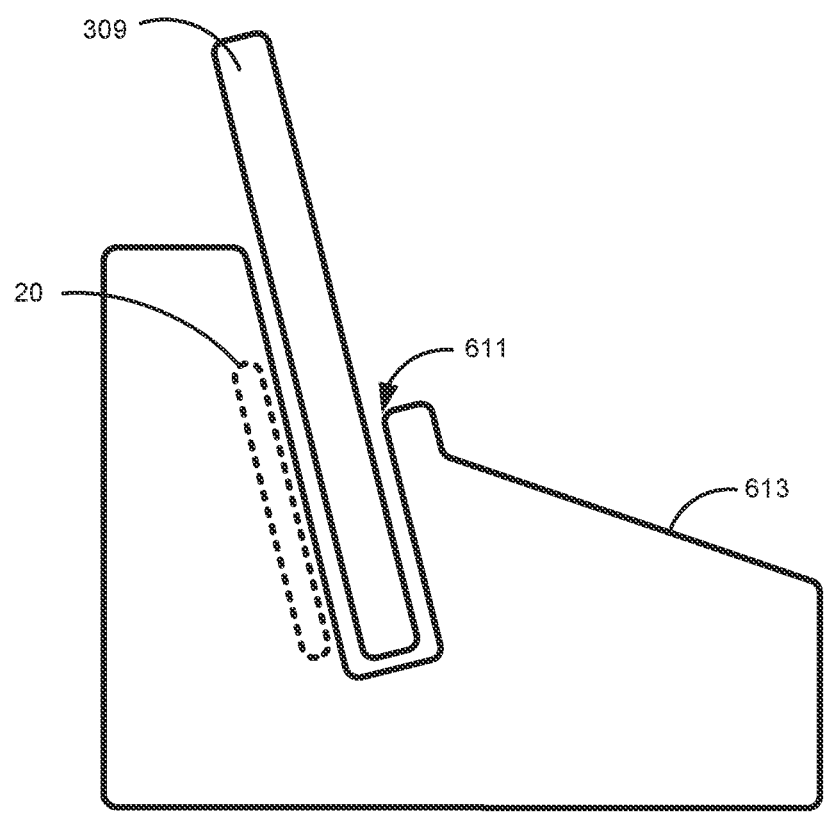
FIG. 7 is a schematic cross-sectional view of a bare wireless charging enabled battery pack being charged wirelessly, in accordance with the present disclosure.

Turning to FIG. 7, this figure is similar to FIG. 6, but shows the charging of a bare wireless charging-enabled battery pack 309 rather than an installed pack. In particular, FIG. 7 is a cross-sectional view of the bare wireless charging-enabled battery pack 309 in a station 611 of a charger dock 613. The charger dock 613 includes a wireless transmission system 20 within coupling range of the wireless charging-enabled battery pack 309, when the battery pack 309 is positioned within the charger dock 613, to charge the pack. The charger dock 613 station 611 is physically configured such that the wireless charging-enabled battery pack 309 fits securely therein, wherein the wireless charging-enabled battery pack 309 may or may not be retained via clips or other features or surfaces. As with the charger dock 603, the charger dock 613 of FIG. 7 may include multiple stations to charge multiple battery packs.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A wireless charging system comprising:
   a battery-powered mobile electronic device having an installed battery pack, wherein the battery-powered mobile electronic device is configured for wired-only charging of the installed battery pack;
   a component group within the installed battery pack, the component group comprising:
      one or more battery cells;
      a power management integrated circuit (IC) configured to manage charging of the one or more battery cells;
      a wireless receiver system configured to wirelessly receive power from a power source outside of the battery-powered mobile electronic device for charging the one or more battery cells; and
      a pack microcontroller interfaced to the battery-powered mobile electronic device, presenting an interface between components of the battery powered mobile electronic device and the component group within the installed battery pack,
   wherein the battery-powered mobile electronic device is configured for wired-only charging of the installed battery pack via a wired charging port.

2. The wireless charging system in accordance with claim 1, wherein the one or more battery cells comprise one or more lithium ion battery cells.

3. The wireless charging system in accordance with claim 2, wherein the one or more battery cells are configured as a one-serial/two-parallel (1S2P) battery.

4. The wireless charging system in accordance with claim 2, wherein the power management IC is configured to select one of wireless charging or wired charging of the one or more battery cells.

5. The wireless charging system in accordance with claim 1, wherein the pack microcontroller communicates in accordance with I2C protocol.

6. The wireless charging system in accordance with claim 5, wherein the pack microcontroller is configured to act as an I2C slave with respect to the battery-powered mobile electronic device and as an I2C master with respect to the power management IC and the wireless receiver sytem.

7. A wireless charging system having a battery pack comprising:
   one or more battery cells;
   a power management integrated circuit (IC) configured to manage charging of the one or more battery cells;
   a wireless receiver system configured to wirelessly receive power from a power source outside of the battery pack for charging the one or more battery cells; and
   a pack microcontroller configured to interface to a legacy battery-powered mobile electronic device that has wired-only battery charging, and to present an interface between components of the battery powered mobile electronic device and a component group within an installed battery pack,
   wherein the battery pack is configured for wired-only charging of the one or more battery cells via a wired charging port.

8. The wireless charging system in accordance with claim 7, wherein the one or more battery cells comprise one or more lithium ion battery cells.

9. The wireless charging system in accordance with claim 8, wherein the one or more battery cells are configured as a one-serial/two-parallel (1S2P) battery.

10. The wireless charging system in accordance with claim 8, wherein the power management IC is configured to select one of wireless charging or wired charging of the one or more battery cells.

11. The wireless charging system in accordance with claim 7, wherein the pack microcontroller communicates in accordance with I2C protocol.

12. The wireless charging system in accordance with claim 11, wherein the pack microcontroller is configured to act as an I2C slave with respect to the battery-powered mobile electronic device and as an I2C master with respect to the power management IC and the wireless receiver system.

13. A wireless charging system comprising:
   a wireless charging dock having multiple charging stations, wherein each of the multiple charging stations is configured to receive a legacy battery-powered mobile electronic device manufactured to support wired-only battery charging; and
   a wireless power transfer unit associated with each of the multiple charging stations, the wireless power transfer unit having a wireless power transfer coil configured to align with a battery compartment of the legacy battery-powered mobile electronic device when the legacy battery-powered mobile electronic device is installed in at least one of the multiple charging stations.

14. The wireless charging system in accordance with claim 13, wherein each of the multiple charging stations includes one or more features to retain the legacy battery-powered mobile electronic device within the charging station.

15. The wireless charging system in accordance with claim 13, wherein the wireless charging dock is configured to operate at a specific operating frequency.

16. The wireless charging system in accordance with claim 15, wherein the wireless charging dock is configured to operate over a range of operating frequencies including the specific operating frequency.

17. The wireless charging system in accordance with claim 13, wherein the wireless charging dock is configured to initiate charging when a legacy battery-powered mobile electronic device is placed in at least one of the multiple charging stations.

18. The wireless charging system in accordance with claim 17, wherein the wireless charging dock is configured to initiate charging by activating the wireless power transfer unit associated with each of the multiple charging stations in which the legacy battery-powered mobile electronic device has been placed.

* * * * *